United States Patent [19]
Lhernould

[11] Patent Number: 5,439,306
[45] Date of Patent: Aug. 8, 1995

[54] DEVICE FOR ASSEMBLING TWO ELEMENTS OF MATERIALS HAVING DIFFERENT COEFFICIENTS OF THERMAL EXPANSION

[75] Inventor: Jacques C. N. Lhernould, Merignac, France

[73] Assignee: Societe Nationale Industrielle et Aerospatiale, Paris Cedex, France

[21] Appl. No.: 351,106

[22] Filed: Nov. 30, 1994

Related U.S. Application Data

[63] Continuation of Ser. No. 991,311, Dec. 16, 1992, abandoned.

[30] Foreign Application Priority Data

Dec. 16, 1991 [FR] France ................ 91 15841

[51] Int. Cl.⁶ .................... B01J 8/34; F16B 5/06
[52] U.S. Cl. .................... 403/179; 403/404; 403/30; 403/28; 239/397.5; 239/600; 239/DIG. 19
[58] Field of Search .......... 403/28–30, 403/32, 41, 179, 338, 386, 387, 404, 389, 390, 396, 24; 239/397.5, 600, DIG. 19; 432/258; 264/57–59; 138/147, 149, 140

[56] References Cited

U.S. PATENT DOCUMENTS

| | | | |
|---|---|---|---|
| 1,011,245 | 12/1911 | Rafter | 403/404 |
| 1,925,867 | 9/1933 | Dunlop | 403/387 |
| 1,960,120 | 5/1934 | Mohring | 138/140 |
| 2,705,414 | 4/1955 | Rose | 138/147 |
| 3,853,586 | 12/1974 | Olcott | 239/DIG. 19 |
| 4,100,962 | 7/1978 | Housman | 403/30 |
| 4,628,756 | 12/1986 | Kimura | 403/28 |
| 4,698,255 | 10/1987 | Pineau | |
| 4,732,177 | 3/1988 | Maus et al. | 138/147 |
| 4,810,677 | 3/1989 | Heinze et al. | |
| 5,119,555 | 6/1992 | Johnson | 403/28 |

FOREIGN PATENT DOCUMENTS

| | | |
|---|---|---|
| 2577471 | 8/1986 | France . |
| 3638658 | 4/1988 | Germany . |
| 4114768 | 11/1991 | Germany . |
| 0758213 | 3/1954 | United Kingdom . |
| 2187499 | 9/1987 | United Kingdom . |

*Primary Examiner*—Anthony Knight
*Attorney, Agent, or Firm*—Sandler, Greenblum & Bernstein

[57] ABSTRACT

Device for assembling two elements made of materials having different coefficients of thermal expansion, which are subject in use to substantial temperature variations, is provided with a combination of a layer of a compressible, heat insulating material, positioned between a support element and an attached element, and an mechanism for maintaining the attached element against the layer, and the layer against the support element. The mechanism is arranged so as to enable relative movement between the two elements in a plane substantially parallel to the plane of the layer. Also, surface portions of the attached element in contact with the mechanism are substantially parallel to the plane of the layer, and a material similar to the material of the layer is positioned between the surface portions and the mechanism. The device is especially applicable to the attachment of insulating elements on a metallic structure.

23 Claims, 1 Drawing Sheet

DEVICE FOR ASSEMBLING TWO ELEMENTS OF MATERIALS HAVING DIFFERENT COEFFICIENTS OF THERMAL EXPANSION

This application is a continuation of application Ser. No. 07/991,311, filed Dec. 16, 1992, now abandoned.

BACKGROUND OF THE INVENTION

1. Field of the Invention

The present invention is directed to a device for assembling two elements together, the elements being constituted of materials that have substantially different coefficients of thermal expansion, and, in use, are subjected to substantial temperature variations, in the order of several hundred degrees centigrade, causing differential expansions that result in stresses which can adversely affect either or both of the elements.

More specifically, the present invention is directed to a plate assembly composed of a refractory material mounted on a metallic wall, and, in particular, to a plate assembly, known as a "hot bed" in a divergent plasma nozzle. However, the present invention is not limited to such a particular embodiment, but finds a more general application to any assembly of plates in which the plates are subjected to substantial temperature variations. For example, the assembly of plates, planar or otherwise, can comprise a coating for a wall, which is either internal, such as the wall of a conduit or an enclosure, or which is external, and whose respective materials, such as a decorative plate and a corresponding receiving wall, are subject to substantial temperature variations.

2. Discussion of Background Information

The hot bed of a plasma nozzle is a substantially planar plate formed of a refractory material, such as a silicon foam, located in the continuity of a internal wall of the divergent nozzle, and is adapted to form a localized screen to the cooling system of the internal wall 21, enabling the level of available heat flow at the exit of the nozzle to be substantially increased.

Such a plate is usually fixed by adhesion onto a metallic sole which is in contact, by its opposing face, with the cooled structure of the nozzle with which it is affixed.

The main problem in this type of assembly is the substantial differential expansion between the plate composed of the refractory material and the metallic sole, with the plate being capable of being raised to temperatures reaching or exceeding 1700° C., such phenomena occurring for prolonged durations, such as 30 minutes.

This is the reason why, for a hot bed approximately 50 centimeters long, it is normal to note an elongation differential between the bed and sole in the order of 2 to 3 mm, which obviously poses problems of retention, both for the refractory material of the bed and for the adhesive material of the bed on the metallic sole.

Such a problem is also encountered in other fields of application. One such application, for example, involves refractory coatings for conduits adapted to transport gas flows that are raised to temperatures as high as 2000° C. to 2500° C.

French Patent FR-2,577,471, by the same assignee, has proposed a type of coating for solving the problem of differential expansion. Specifically, in this document, the coating is composed of a refractory structure formed of several superposed layers having different thermal characteristics enabling differential expansions to be absorbed. However, this technology is complex and gives rise to substantially thick, multi-layered structures that are particularly inappropriate for incorporation of a hot bed in a plasma nozzle structure.

SUMMARY OF THE INVENTION

The main object of the present invention is to provide an assembly which eliminates stresses resulting from differences in behavior between a refractory material which is brought to high temperatures, and a metallic support which can be simultaneously individually cooled.

Further, it is a principal object of the present invention to enable easy replacement of the refractory material, especially when the refractory material has been damaged, or when the refractory material should be replaced by materials having different characteristics adapted to other types of tests.

To this end, it is an object of the present invention to provide an assembly device for two elements composed of materials having different coefficients of thermal expansion, the elements being subject to substantial temperature variations, including the combination of a layer of compressible, heat insulating material positioned between a support element and an attached element, and means for maintaining the attached element against the layer, and the layer against the support element. The means for maintaining are affixed to the support element and arranged so as to enable relative movement between the two elements in a plane which is substantially parallel to a plane passing through the layer, surface portions of the attached element in contact with said means for maintaining being substantially parallel to the plane passing through the layer, and a material similar to the material of the layer is positioned between the surface portions and the means for maintaining.

When the application of the present invention is the assembly of a hot bed made of refractory material onto the wall of a plasma nozzle, the support element is a metallic sole, the intermediate insulating layer has a constant thickness and is positioned between two planar surfaces of the hot bed and of the metallic sole, respectively, and the means for maintaining are constituted by at least one peripheral strap having a support wing which is substantially parallel to the planar surfaces and whose working surface is equipped with an insulating pad of the same material as the intermediate layer.

By virtue of interpositioning of a layer of compressible, heat insulating material in front of all the contact zones between the hot bed or attached element, and the metallic sole or support element, the assembly according to the present invention enables a relative, stress-free displacement between the two elements, especially in a plane substantially parallel to the plane of the intermediate layer, during temperature rises and therefore during expansion of the hot bed.

With regard to the above, the provision of insulating and sliding pads in front of the connections between the hot bed made of a refractory material and the generally metallic straps for maintaining stop all deterioration of the hot bed in the vicinity of the attachment points by ensuring better stress distribution in the mass of the refractory material.

Additionally, as discussed above, the assembly is easily disassembled, such as by the removable of the straps. Therefore, the bed made of refractory material is easily removed to enable the bed to be quickly changed when necessary to change the bed material in accordance with test conditions.

The component material of the intermediate layer and the insulating pads can be a flexible fibrous based material chosen from the product manufactured by ASH and commercially known as ASH paper 1600, the product manufactured by the company KERLANE and commercially known as PYRONAP felt 70, and any other aluminum and/or silicon based flexible fiber refractory material that can withstand temperatures that could be encountered by the assembly.

In another manner of describing the present invention, it is an object of the present invention to provide a device for assembling two elements made of materials having different coefficients of thermal expansion, which materials are subject to substantial temperature variations, comprising a layer of a first compressible, heat insulating material capable of being positioned between a first element and a second element; means for maintaining the second element against the layer and the layer against the first element, and for enabling relative movement between the two elements in a plane substantially parallel to a plane passing through the layer, the means for maintaining including a section adapted to be spaced a distance from at least one surface portion of the second element, the at least one surface portion being substantially parallel to the plane passing through the layer; and a second compressible, heat insulating material positionable between the section and the at least one surface portion.

Further, it is an object of the present invention to provide a device for assembling two elements made of materials having different coefficients of thermal expansion, which materials are subject to substantial temperature variations, comprising a first element; a second element adapted to be attached to the first element; a layer of a first, compressible heat insulating material capable of being positioned between the first element and the second element; means for maintaining the second element against the layer and the layer against the first element, and for enabling relative movement between the two elements in a plane substantially parallel to a plane passing through the layer; the second element including at least one surface portion which is substantially parallel to the plane passing through the layer, and the means for maintaining including a section spaced a distance from the at least one surface portion of the second element; and a second compressible, heat insulating material positioned between the section and the at least one surface portion.

More specifically, the first element can comprise a support element, and the second element can comprise an attached element. The attached element can comprise a hot bed composed of a refractory material, such as a hot bed associated with the wall of a plasma nozzle, and the support element can comprise a metallic sole. Further, the layer can have a substantially constant thickness.

The means for maintaining can comprise at least one peripheral strap including the section, with the section being substantially parallel to the plane passing through the layer, and the compressible, heat insulating material can comprise a pad.

At least one housing can be positioned at a lateral portion of the first element and the second element, and the means for maintaining can be positioned in the at least one housing. Further, the means for maintaining can be directly fixed to the first element, such as by at least one screw and a corresponding aperture.

The first compressible, heat insulating material and the second compressible, heat insulating material can be composed of the same material, and, as discussed above, can comprise ASH paper 1600, PYRONAP felt 70, or at least one of aluminum and silicon based compressible fibrous refractory materials that can withstand high temperatures.

Also, a protective screen can be positioned along lateral edges of the first element and the second element.

BRIEF DESCRIPTION OF THE DRAWINGS

Other characteristics and advantages of the present invention will become more apparent from the description that follows of an embodiment of the assembly according to the invention, the description being provided as a non-limiting example only, and with reference to the annexed drawings in which.

DETAILED DESCRIPTION OF THE PREFERRED EMBODIMENTS

Figure 1:
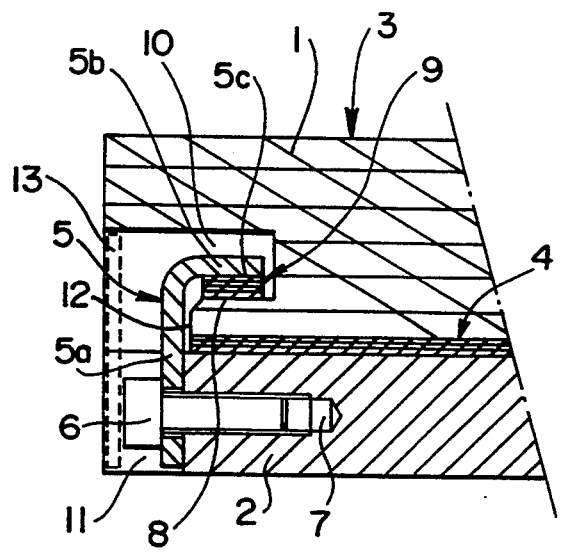
FIG. 1 is a partial view in a vertical section of the hot bed assembled as per the invention.
Figure 2:
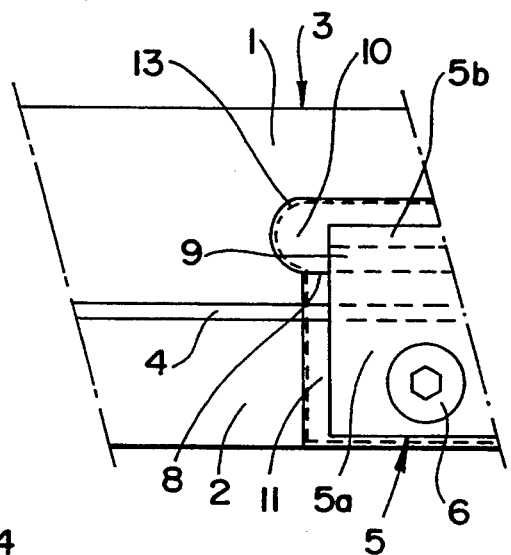
FIG. 2 is a partial view from the left side of the assembly of FIG. 1.
Figure 3:
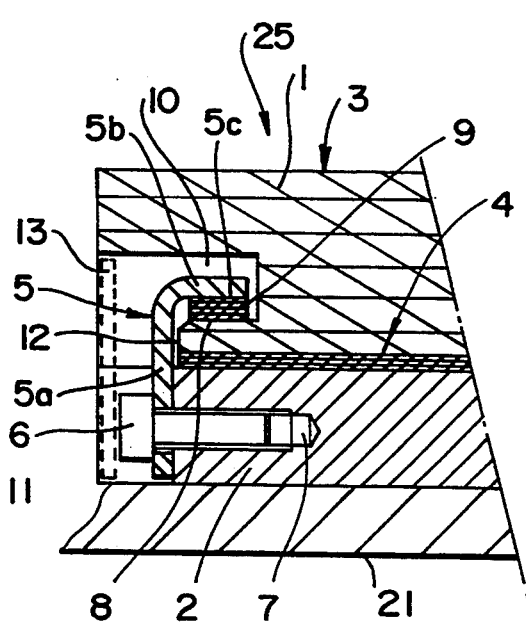
FIG. 3 is a schematic view of a plasma nozzle including a hot plate.

As can be seen in the drawings, a plate or hot bed 1 is formed of a rigid refractory material having a generally trapezoidal shape, assembled on a metallic sole 2 formed by a plate also having a general trapezoidal shape.

Plate 1, which is adapted specifically to be mounted in a plasma nozzle divergent for tests of specimens or other similar materials at high temperatures, is composed of, for example, a material chosen from the group consisting of silicon foam, especially the product known as ZYAROCK 50 or ZYAROCK 75 marketed by VESUVIUS, rigid aluminum- and silicon-based fibrous materials, surface treated or otherwise, such as the product known as KAPYROK S 1600 marketed by KAPYROK, the product known as KERANAP 70 marketed by KERLANE, and the product known as PROCELIT 160 or PROCELIT 170 marketed by PROCELIS. The choice of material especially takes into account the working conditions that are to be encountered, such as surface temperature or aerodynamic shearing, the parameters that need to be favored for each type of test, such as durability or surface condition of the refractory material during blast off, and the costs of the various materials which vary according to the maximum variable functional temperature.

Plate 1 has a substantially planar upper surface 3 adapted to be placed at level with an internal lower wall of the nozzle divergent in which it is assembled.

The lower surface of plate 1 is also substantially planar and rests on the substantially planar upper surface of metallic sole 2 by means of a layer 4 made of an insulating material, for example, of flexible fibers. The insulating material can comprise, for example, the product known as ASH paper 1600 marketed by ASH, the product known as PYRONAP felt 70 marketed by KERLANE, or any other aluminum and/or silicon based, compressible, fibrous refractory material that can withstand the functional temperatures imposed.

The thickness of layer 4 is substantially constant, and of the order of a few millimeters.

Plate 1 rests on the intermediate insulating layer 4 and is maintained in position and slightly pressed against metallic sole 2 by means of metallic straps 5, one of which is illustrated in the drawings, constituted by square mounts.

Each strap 5 comprises a vertical wing 5a directly fixed to metallic sole 2 by at least one screw 6 that is screwed into corresponding hole 7 of sole 2, and a wing 5b whose support face 5c, substantially parallel to the plane of layer 4 and substantially perpendicular to vertical wing 5a, is in front of a surface portion 8 arranged in plate 1, substantially parallel to the plane of layer 4. As can be seen in FIG. 1, vertical wing 5a is affixed by screw 6 to edge 2' of metallic sole 2.

A compressible, heat insulating pad 9 is located between opposing surfaces 5c and 8. This pad can be composed of the same material as layer 4.

In the illustrated embodiment, surface 8 is arranged, by machining a housing 10, in the section of plate 1 enabling engagement of strap wing 5b and its pad 9, and the integration of the strap 5-screw 6 assembly inside the general volume of refractory plate 1 and of metallic sole 2, which is also, to this end, provided with a housing 11 for receiving said strap 5-screw 6 assembly.

With such an assembly, intermediate layer 4 stops all direct contact between plate 1 and sole 2, and pads 9 stop any indirect contact via straps 5 whose vertical wings 5a, although pressed against sole 2, are at a sufficient distance from edge 12 of plate 1 which is demarcated during machining from housing 10 and whose wing end 5b is also at an adequate distance from the base of the housing 10.

Thus, during temperature rises of the nozzle, when plate 1 can be brought to temperatures reaching or exceeding 1700° C., layer 4 and pads 9 act as sliding soles enabling a free relative displacement between refractory plate 1 and metallic sole 2 in a plane substantially parallel to the plane of layer 4.

The assembly enables all differential expansion between the two elements 1 and 2 to be absorbed, with the expansion stresses being uniformly distributed in the mass of plate 1, including the attachment zones of such plate, by virtue of the provision of sliding insulating pads 9.

The integration of the attachment elements 5,6 inside the general volume defined by the plate 1-sole 2 assembly, enables such attachment elements to be distanced from the lateral walls of the bed, and, by adding a protective screen 13 made of a flexible fibrous material, ensures better protection of the attachment with respect to possible infiltrations of hot gases along the flanks of the bed.

The device of the invention thus enables the durability of refractory plates 1 to be increased. It also enables the plate to be easily changed and reduces the manufacturing and maintenance costs of hot beds.

The attachment of the plate 1-sole 2 assembly on the cooled structure of the plasma nozzle 25 occurs normally, by means of metallic sole 2.

Plate 1 generally comprises two sets of straps 5 distributed on two opposing longitudinal flanks of plate 1, which are normally trapezoidal.

The invention can also be used, of course, for the assembly of any element, especially an insulating element, that is required to withstand substantial temperature variations, on a support structure, especially a metallic support, subject or not to the same temperature variations. The assembly of the present invention can therefore be used, for example, in hot gas conduits of blast furnaces, hot wind tunnels, propulsion test bases of missiles or planes, solid or liquid propellant motors, subject to convective or radiative thermal flows.

The invention is not limited to the embodiment represented and described hereinabove, but encompasses, on the contrary, all variations thereof, especially as regards the shape and arrangement of the maintenance elements of refractory plate 1 on sole 2 and of pads 9 or similar materials, positioned between such elements and the refractory plates.

This application corresponds to French Application No. 91 15841, filed Dec. 16, 1991, whose priority is claimed under 35 U.S.C. 119, and whose disclosure is incorporated by reference herein in its entirety.

What is claimed:

1. Device for assembling two elements made of materials having different coefficients of thermal expansion, which materials are subject to substantial temperature variations, comprising:

a layer of a first compressible, heat insulating material capable of being positioned between a first element having an upper surface and an outer edge, and a second element comprising at least one surface portion;

means for maintaining the second element against said layer and said layer against the first element, and for enabling relative movement between the two elements in any direction in a plane substantially parallel to a plane passing through said layer, said means for maintaining including a first section adapted to be connected to the outer edge of the first element, and a second section adapted to be spaced a distance from at least one surface portion of the second element, the at least one surface portion being substantially parallel to said plane passing through said layer;

a second compressible, heat insulating material positionable between said second section and the at least one surface portion; and said first section of said means for maintaining adapted to be spaced a distance from an opposing face of said second element, said opposing face being located between said first and second compressible heat insulating materials.

2. Device for assembling two elements made of materials having different coefficients of thermal expansion, which materials are subject to substantial temperature variations, comprising:

a first element comprising an upper surface and an outer edge;

a second element adapted to be attached to said first element;

a layer of a first, compressible heat insulating material capable of being positioned between said upper surface of said first element and said second element;

means for maintaining said second element against said layer and said layer against said first element, and for enabling relative movement between the two elements in any direction in a plane substantially parallel to a plane passing through said layer;

said second element including at least one surface portion which is substantially parallel to said plane passing through said layer, and said means for maintaining including a first section adapted to be connected to said outer edge of said first element, and a second section spaced a distance from said at least one surface portion of said second element;

a second compressible, heat insulating material positioned between said second section and said at least one surface portion; and said first section of said means for maintaining adapted to be spaced a distance from an opposing face of said second element, said opposing face being located between said first and second compressible heat insulating materials.

3. The device according to claim 2, wherein said first element comprises a support element, and said second element comprises an attached element.

4. The device according to claim 3, wherein said attached element comprises a hot bed composed of a refractory material.

5. The device according to claim 4, wherein said support element comprises a metallic sole.

6. The device according to claim 5, wherein said hot bed is associated with the wall of a plasma nozzle.

7. The device according to claim 6, wherein said layer has a substantially constant thickness.

8. The device according to claim 6, wherein said first section is substantially perpendicular to said second section, said second section is substantially parallel to said plane, and said compressible, heat insulating material comprises a pad.

9. The device according to claim 5, wherein said layer has a substantially constant thickness.

10. The device according to claim 5, wherein said first section is substantially perpendicular to said second section, said second section is substantially parallel to said plane, and said compressible, heat insulating material comprises a pad.

11. The device according to claim 10, comprising at least one housing at a lateral portion of said first element and said second element, and said first section is positioned in said at least one housing.

12. The device according to claim 11, wherein said first second is directly fixed to said first element.

13. The device according to claim 11, comprising at least one screw and at least one corresponding aperture in said first element for directly fixing said first section to said first element.

14. The device according to claim 11, wherein said first compressible, heat insulating material and said second compressible, heat insulating material are composed of the same material.

15. The device according to claim 14, wherein said same material comprises ASH paper 1600, PYRONAP felt 70, or at least one of aluminum and silicon based compressible fibrous refractory materials that can withstand high temperatures.

16. The device according to claim 14, wherein said hot bed is associated with the wall of a plasma nozzle.

17. The device according to claim 2, wherein said first section is substantially perpendicular to said second section, said second section is substantially parallel to said plane, and said compressible, heat insulating material comprises a pad.

18. The device according to claim 2, comprising at least one housing at a lateral portion of said first element and said second element, and said means for maintaining is positioned in said at least one housing.

19. The device according to claim 18, wherein said means for maintaining is directly fixed to said outer edge of said first element.

20. The device according to claim 19, wherein said means for maintaining comprise at least one screw and at least one corresponding aperture in said outer edge of said first element.

21. The device according to claim 2, wherein said first compressible, heat insulating material and said second compressible, heat insulating material are composed of the same material.

22. The device according to claim 21, wherein said same material comprises ASH paper 1600, PYRONAP felt 70, or at least one of aluminum and silicon based compressible fibrous refractory materials that can withstand high temperatures.

23. Device for assembling two elements made of materials having different coefficients of thermal expansion, which materials are subject to substantial temperature variations, comprising:

a first element;

a second element adapted to be attached to said first element;

a layer of a first, compressible heat insulating material capable of being positioned between said first element and said second element;

means for maintaining said second element against said layer and said layer against said first element, and for enabling relative movement between the two elements in a plane substantially parallel to a plane passing through said layer;

said second element including at least one surface portion which is substantially parallel to said plane passing through said layer, and said means for maintaining including a section spaced a distance from said at least one surface portion of said second element;

a second compressible, heat insulating material positioned between said section and said at least one surface portion; and a protective screen along lateral edges of said first element and said second element.

* * * * *

UNITED STATES PATENT AND TRADEMARK OFFICE
CERTIFICATE OF CORRECTION

PATENT NO. : 5,439,306
DATED : August 8, 1995
INVENTOR(S) : Jacques C. N. LHERNOULD It is certified that error appears in the above-indentified patent and that said Letters Patent is hereby corrected as shown below:

On title page, in section [73], "Assignee", lines 1 and 2, change "Societe Nationale Industrielle et Aerospatiale" to ---Aerospatiale Societe Nationale Industrielle (SA)---.

At column 7, line 41 (claim 12, line 2), change "second" should be changed to ---section---.

Signed and Sealed this

Fifteenth Day of October, 1996

Attest:

BRUCE LEHMAN

Attesting Officer     Commissioner of Patents and Trademarks